(12) United States Patent
Yamada et al.

(10) Patent No.: US 9,365,992 B2
(45) Date of Patent: Jun. 14, 2016

(54) PNEUMATIC FENDER

(71) Applicant: The Yokohama Rubber Co., LTD., Minato-ku, Tokyo (JP)

(72) Inventors: Shu Yamada, Hiratsuka (JP); Shigeki Sakakibara, Hiratsuka (JP); Michito Kaneko, Hiratsuka (JP); Minami Izumi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/397,462

(22) PCT Filed: Apr. 24, 2013

(86) PCT No.: PCT/JP2013/062060
§ 371 (c)(1),
(2) Date: Oct. 27, 2014

(87) PCT Pub. No.: WO2013/161874
PCT Pub. Date: Oct. 31, 2013

(65) Prior Publication Data
US 2015/0091226 A1  Apr. 2, 2015

(30) Foreign Application Priority Data

Apr. 27, 2012 (JP) ................................. 2012-103284

(51) Int. Cl.
*F16M 1/00* (2006.01)
*E02B 3/26* (2006.01)

(52) U.S. Cl.
CPC ........................................ *E02B 3/26* (2013.01)

(58) Field of Classification Search
CPC ............... E02B 3/26; E02B 3/20; E02B 3/28; B60C 3/02

USPC .................. 267/140, 139, 136, 153; 114/219, 114/230.1; 156/117
See application file for complete search history.

(56) References Cited

U.S. PATENT DOCUMENTS 3,063,400 A * 11/1962 Yamaguchi ............... E02B 3/26
114/219

(Continued)

FOREIGN PATENT DOCUMENTS

| JP | 05278150 A | * 10/1993 |
| JP | H05-286053 | 11/1993 |
| JP | H06-33433 | 2/1994 |
| JP | 2000064253 A | * 2/2000 |

(Continued)

OTHER PUBLICATIONS

International Search Report for International Application No. PCT/JP/2013/062060 dated Jun. 18, 2013, 4 pages, Japan.

*Primary Examiner* — Pamela Rodriguez
(74) *Attorney, Agent, or Firm* — Thorpe North & Western LLP

(57) ABSTRACT

A pneumatic fender having a body portion is configured by laminating a plurality of reinforcing layers between the inner layer rubber and the outer layer rubber. Cords of reinforcing layers are laminated adjacent to each other. The cords intersect and are arranged at a predetermined cord angle with respect to the body axial direction. An intermediate rubber layer is interposed between each of the reinforcing layers. In an uninflated, neutral state, the thicknesses of the intermediate rubber layers are 1 mm to 5 mm, and the cord angle is set from 15° to 45°, so when the interior of the fender is filled with air to the prescribed internal pressure, the cord angle increases to a static angle while the intermediate rubber layers deform in shear, and the body portion increases in diameter and inflates.

9 Claims, 4 Drawing Sheets

(56) References Cited

U.S. PATENT DOCUMENTS

| | | | | |
|---|---|---|---|---|
| 3,125,979 A | * | 3/1964 | Darling | E02B 3/26 114/219 |
| 3,776,792 A | * | 12/1973 | Grawey | B60C 3/02 156/117 |
| 4,054,476 A | * | 10/1977 | Hara | E02B 3/26 114/219 |
| 2006/0223399 A1 | | 10/2006 | Kurimoto et al. | |

FOREIGN PATENT DOCUMENTS

| | | | |
|---|---|---|---|
| JP | 2003-129446 | | 5/2003 |
| JP | 2006-272784 | | 10/2006 |
| JP | 2006291628 A | * | 10/2006 |
| JP | 2008-115625 | | 5/2008 |
| JP | 2009299389 A | * | 12/2009 |
| JP | WO-2014181623 A1 | * | 11/2014 |

* cited by examiner

PNEUMATIC FENDER

TECHNICAL FIELD

The present technology relates to a pneumatic fender, and more particularly relates to a pneumatic fender that is capable of being greatly enlarged during use compared with when it is not being used, such as during storage, transport, and the like.

BACKGROUND

A pneumatic fender is used, for example, when transferring crude oil between two adjacent ships, the pneumatic fender is installed between the two hulls to prevent contact between the hulls. Alternatively it is installed on a quay wall or the like, to prevent contact between the quay wall or the like and a ship's hull. In recent years ships' hulls are getting larger and the sea conditions are becoming more severe, so there is a demand for large (large diameter) pneumatic fenders with excellent impact performance.

Pneumatic fenders normally have a cylindrical-shaped body portion with bowl-shaped mirror-sections provided at both ends, and the body portion has a laminated configuration with a plurality of reinforcing layers between inner layer rubber and outer layer rubber. The reinforcing layers are cord layers formed by arranging a plurality of cords in parallel, and the cords are disposed at a predetermined cord angle with respect to the axial direction of the cylinder. The cords of reinforcing layers that are laminated adjacent to each other are disposed so that they intersect (for example, see Japanese Unexamined Patent Application Publication Nos. H5-286053, 2003-129446). Conventionally the cord angle is set to a static angle of about (54° to 55°) in an uninflated neutral state, so even when the interior of the pneumatic fender is filled with air to the prescribed internal pressure, its size (length and external diameter) does not change much.

In this case, if the pneumatic fender is simply made larger in order to increase the impact performance, its handleability when it is not being used, such as in storage, transport, and installation, is significantly reduced. Specifically, wide space is needed to store the pneumatic fender. Also, a large transport ship is necessary to transport it to its place of installation, and the lifting device such as a crane or the like must also be large. Also, during transport and installation it is difficult to move, so much effort is required. Therefore a pneumatic fender that is compact when not being used, and that greatly expands as much as possible when it is being used is desirable.

SUMMARY

The present technology provides a pneumatic fender that is capable of being greatly enlarged during use compared with when it is not being used, such as during storage, transport, and the like The pneumatic fender according to the present technology comprises mirror sections at the two ends of a cylindrical body portion, a plurality of reinforcing layers is laminated between an inner layer rubber and an outer layer rubber, the reinforcing layers are cord layers formed by arranging a plurality of cords parallel, the cords of reinforcing layers that are laminated adjacent to each other intersect and have a predetermined cord angle with respect to the body axial direction, an intermediate rubber layer is interposed between each of the reinforcing layers, and in an uninflated neutral state the thicknesses of the intermediate rubber layers is set to 1 mm to 5 mm, and the cord angle is set to 15° to 45°.

According to the present technology, in the uninflated neutral state the intermediate rubber layers whose thicknesses are 1 mm to 5 mm are interposed between each of the reinforcing layers, the cords of reinforcing layers that are laminated adjacent to each other intersect and have a cord angle that is set to 15° to 45° with respect to the body axial direction, so when the fender is filled with air to the prescribed internal pressure, the cord angle increases to a stable static angle. In this case each of the intermediate rubber layers deforms in shear, so the cord angle increases smoothly up to the static angle. Therefore although the fender is compact when not in use, during use it is possible to greatly expand the diameter of the body portion. If the thickness of the intermediate rubber layer in the neutral state is less than 1 mm, the shear force between layers during inflation becomes excessive, so adverse effects such as reduction in durability and inter-layer separation and the like can easily occur.

In this case, if the 100% modulus of the rubber of the intermediate rubber layers is 0.5 MPa to 5.0 MPa, the diameter of the body portion can be stably increased sufficiently.

Also, if the 100% modulus of the rubber of the intermediate rubber layers is less than 0.5 MPa, time is required for the body portion to shrink, and there is a possibility that the body portion will not return to its original diameter. On the other hand, if it exceeds 5.0 MPa, the shear force in the intermediate rubber layers increases when inflating, so they have difficulty deforming and it is difficult to expand the diameter of the body portion sufficiently.

It is possible to specify that in the uninflated neutral state, the thickness of the intermediate rubber layers increases towards the outer circumferential side. When inflating the body portion, a greater shear deformation is necessary in the intermediate rubber layers towards the outer side, so this specification has the advantage that it is possible to prevent an excessive load being produced in some of the intermediate rubber layers.

Also, in the uninflated neutral state, the external diameter of the body portion is, for example, 3 m to 5 m. With the external diameter in this range handling when the fender is not in use such as during storage or transport, and the like, is comparatively easy.

DETAILED DESCRIPTION

The pneumatic fender according to the present technology is described below, based on the embodiments shown on the drawings.

Figure 1:
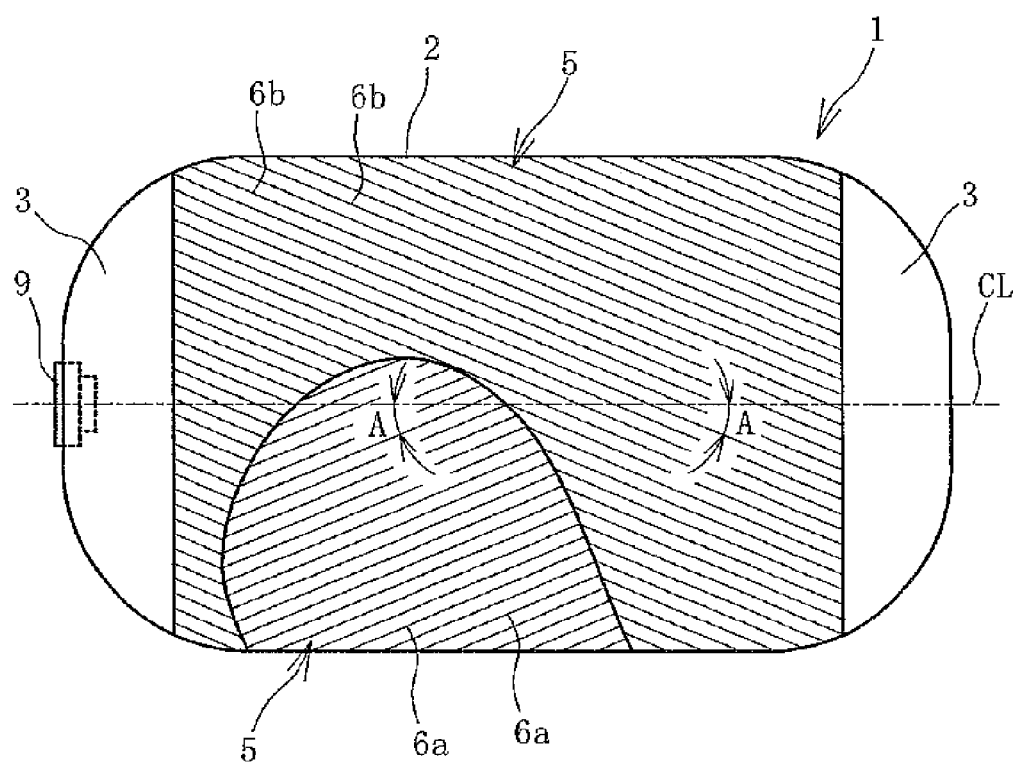
FIG. 1 is an explanatory view showing a side view partially sectioned of a reinforcing layer of the body portion of a pneumatic fender according to the present technology when it is not inflated.
Figure 2:
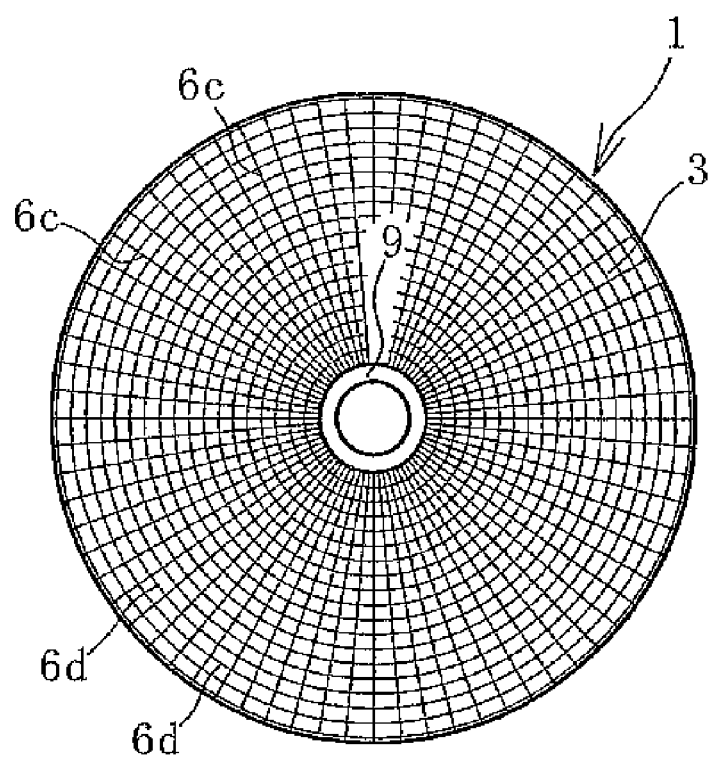
FIG. 2 is an explanatory view showing a front view of the reinforcing layer of the mirror section of the pneumatic fender in FIG. 1.
Figure 3:
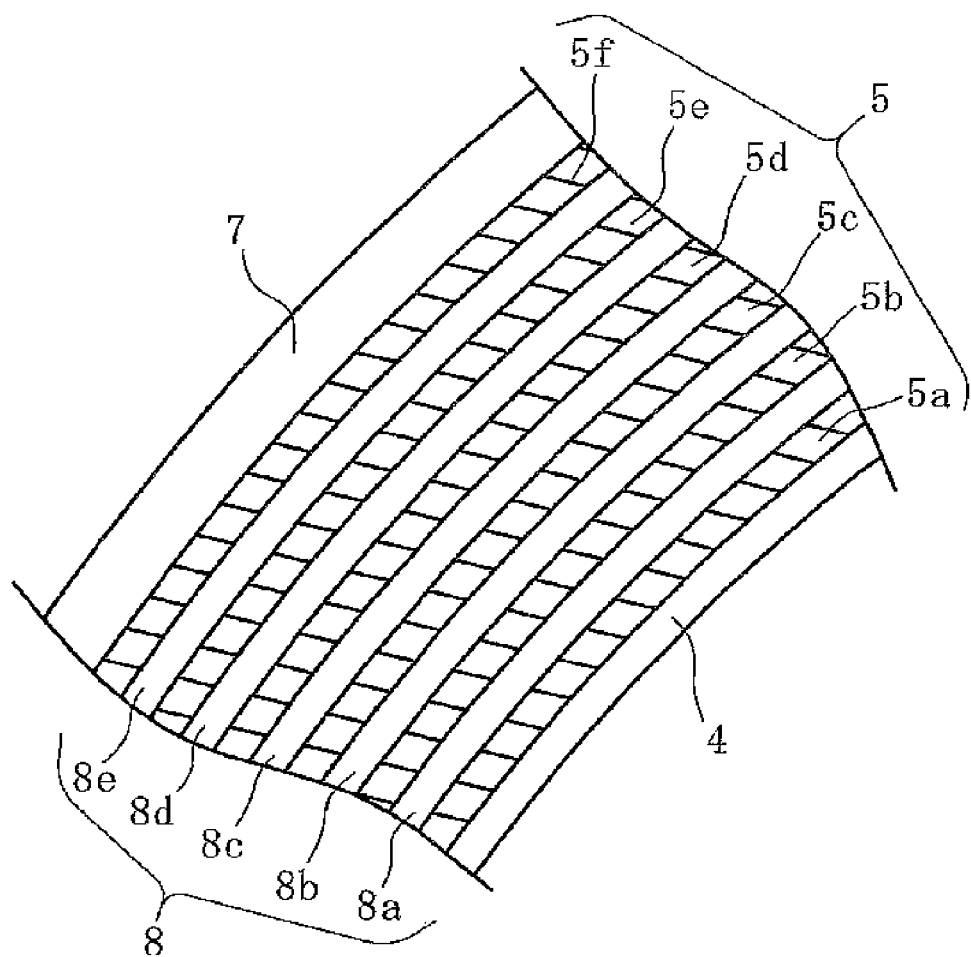
FIG. 3 is a partial enlarged cross-sectional view of the body portion of the pneumatic fender in FIG. 1.

As shown in FIGS. 1 to 3, a pneumatic fender 1 (hereafter referred to as fender 1) according to the present technology includes a cylindrical-shaped body portion 2 and bowl-shaped mirror sections 3 at both ends thereof. In this embodiment, one mirror section 3 is provided with a fitting 9, but this may also be provided to the mirror sections 3 at both ends.

The body portion 2 has a laminated configuration with a plurality of reinforcing layers 5 between an inner layer rubber 4 and an outer layer rubber 7. In this embodiment, six reinforcing layers 5 (5a to 5f) are laminated. The number of laminations of reinforcing layers 5 is, for example, 6 to 12. An intermediate rubber layer 8 (8a to 8e) is disposed between each of the reinforcing layers 5.

Each of the reinforcing layers 8 is a cord layer formed from a plurality of cords 6a (6b) arranged in parallel. The cords 6a, 6b of adjacent laminated reinforcing layers 5 intersect, and are disposed with a predetermined cord angle A with respect to the cylinder axial direction (cylinder center line CL) of the body portion 2. In other words, the reinforcing layer 5a of the inner peripheral side first layer, the reinforcing layer 5c of the third layer, and the reinforcing layer 5e of the fifth layer have a cord angle A in the same direction. The reinforcing layer 5b of the inner peripheral side second layer, the reinforcing layer 5d of the fourth layer, and the reinforcing layer 5f of the sixth layer have a cord angle A in the same direction, and, this cord angle A has the opposite orientation to that of the reinforcing layers 5a, 5c, 5e. The cord angle A may be different among a plurality of reinforcing layers 5, and can be set as appropriate depending on the number of laminations of the reinforcing layers 5, or the cords 6a, 6b, the intermediate rubber layers 8, the external diameter of the body portion 2, and the like, as described later.

Steel cords or organic fiber cords or the like can be used as the cords 6a, 6b. The external diameter of the cords 6a, 6b is, for example, about 0.5 mm to 1.5 mm.

The mirror sections 3 have a laminated configuration with a plurality of reinforcing layers between the inner layer rubber 4 and the outer layer rubber 7. A reinforcing layer (cord layer) formed from cords 6c disposed in a radial manner, and a reinforcing layer (cord layer) formed from cords 6d disposed in the circumferential direction are alternately laminated. The specification of the cords 6c, 6d is basically the same as that of the cords 6a, 6b of the reinforcing layers 5 of the body portion 2.

In the present technology, when the fender 1 is uninflated in a neutral state, the thickness of the intermediate rubber layer 8 is 1 mm to 5 mm, and the cord angle A is set to 15° to 45°. The uninflated neutral state is the state in which tension is not substantially produced in the cords 6a, 6b, air is injected into the interior of the fender 1, but the inner pressure is slightly higher than atmospheric pressure (for example, 10 kPa), so the body portion 2 maintains a cylindrical shape and the mirror sections 3 maintain a bowl shape.

In a conventional pneumatic fender, only very thin adhesive rubber is disposed between two reinforcing layers that are adjacent to each other in the radial direction in order to bond them together. In the present technology, a special intermediate rubber layer 8 is interposed in addition to adhesive rubber. For example natural rubber, butyl rubber, styrene butadiene rubber, acrylonitrile butadiene rubber, or the like are used as the rubber forming the intermediate rubber layer 8.

For example natural rubber, butyl rubber, styrene butadiene rubber, acrylonitrile butadiene rubber, or the like are used as the rubber forming the inner layer rubber 4. For example natural rubber, styrene butadiene rubber, acrylonitrile butadiene rubber, ethylene propylene rubber, or the like are used as the rubber forming the outer layer rubber 7. In the neutral state when the fender 1 is not inflated, the thickness of the inner layer rubber 4 is, for example, about 2 mm to 5 mm, and the thickness of the outer layer rubber 7 is, for example, about 3 mm to 12 mm.

When the fender 1 is not being used, such as during storage, transport, and installation, the internal pressure is reduced to, for example, about 10 kPa to the neutral state in which it is not inflated. Alternatively, the internal air is discharged and it is folded. When the fender 1 is installed and used at the actual installation site, the interior is filled with air via a valve fitted to the fitting 9, to the prescribed internal pressure. The prescribed internal pressure is, for example, 50 kPa to 100 kPa.

Figure 4:
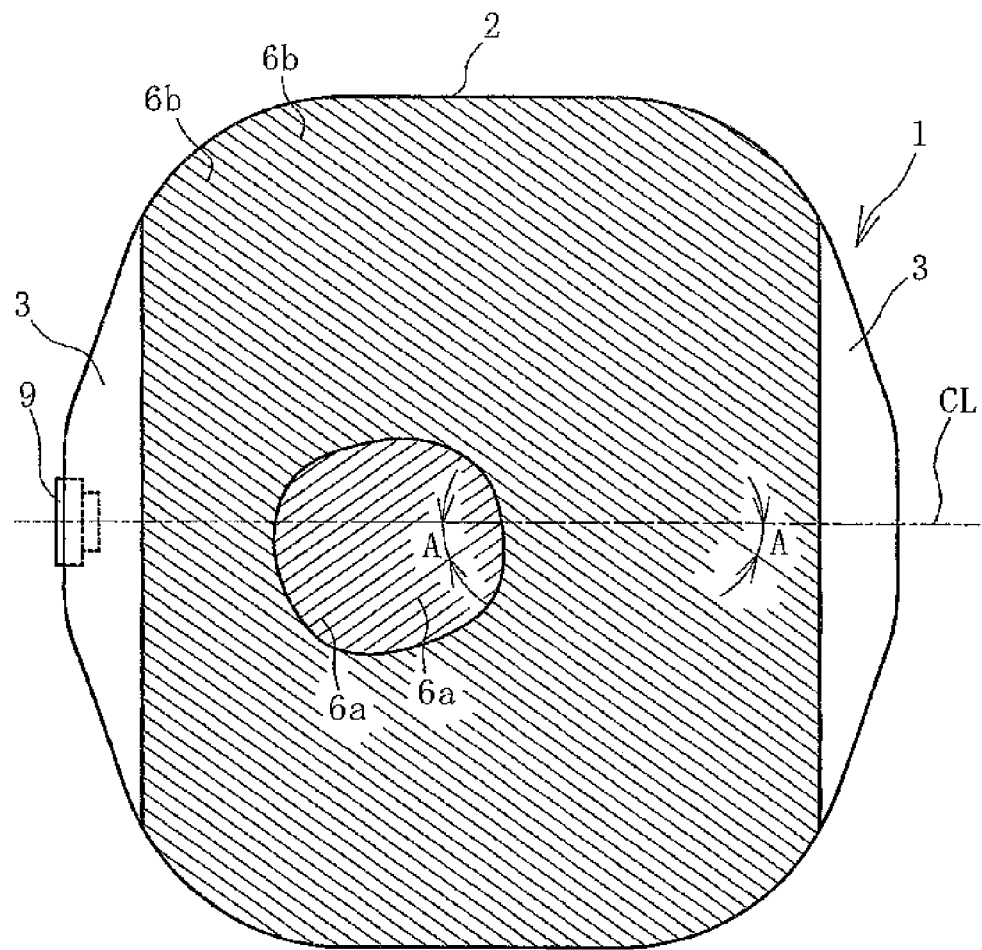
FIG. 4 is an explanatory view showing a side view partially sectioned of a reinforcing layer of the body portion of the pneumatic fender in FIG. 1 when it is inflated.

In the process of filling the interior of the fender 1 with air to the prescribed internal pressure, the cord angle A of the cords 6a, 6b of each of the reinforcing layers 5 increases to a stable static angle (54° to 55°). In this case, the thickness of the intermediate rubber layers 8 in the neutral state is 1.0 mm or more, so each of the intermediate rubber layers 8 deforms in shear appropriately. As a result, as shown in FIG. 4, the cord angle A varies smoothly up to the static angle, so during use the body portion 2 can inflate and increase in diameter greatly.

For example, the external diameter of the body portion 2 can increase by about 150% to 250% during use relative to the neutral state. The length in the axial direction of the fender 1 (body portion 2) can increase by 95% to 60% during use relative to the neutral state.

If the thickness of the intermediate rubber layer 8 is less than 1 mm, it is difficult to deform in shear sufficiently when the fender 1 is inflated. If the thickness of the intermediate rubber layer 8 exceeds 5 mm, the mass of the fender 1 is excessive.

Also, if the cord angle A in the neutral state is less than 15°, excessive shear stress is produced in the intermediate rubber layer 8 to increase the cord angle A to the static angle. If the cord angle A exceeds 45°, the increase in the diameter of the body portion 2 when the prescribed internal pressure is applied from the neutral state is small. In other words, when the cord angle A exceeds 45°, the external diameter of the fender 1 when it is not being used is not very small.

It has also been confirmed that even if the cord angle A in the uninflated neutral state is 15° to 45°, if the thickness of the intermediate rubber layers 8 is less than 1 mm, there is very little increase in the diameter of the body portion 2 when the prescribed internal pressure is applied. In other words, by appropriately setting the cord angle A and the thickness of the intermediate rubber layer 8 in the uninflated neutral state of the fender 1 according to the present technology, the fender 1 is compact in the neutral state when it is not being used, and the diameter of the body portion 2 can increase greatly when it is being used.

In this way, it is possible to reduce the storage space of the fender 1. Also, it is not necessary to provide a large transport ship or transport vehicle to transport the fender 1 to the installation location, and a large crane device or the like need not be used for lifting. The fender 1 is easier to move during transport and installation, so these operations are easier. In this way, the handlability of the fender 1 when it is not being used (when it is not inflated) is improved.

Preferably the 100% modulus of the rubber forming the intermediate rubber layers 8 is 0.5 MPa to 5.0 MPa. If the 100% modulus of the intermediate rubber layers 8 is less than 0.5 MPa, time is required for the body portion to shrink and reduce the diameter, and there is a possibility that the body portion will not return to its original diameter. On the other hand, if it exceeds 5.0 MPa, the shear force in the intermediate rubber layers increases when inflating, so they have difficulty deforming and it is difficult to expand the diameter of the body portion sufficiently.

In this embodiment, in the uninflated neutral state, the thicknesses of all the intermediate rubber layers 8 are the same, but it is possible to specify that the thickness of the intermediate rubber layers 8 increases towards the outer circumferential side. When inflating the body portion 2, a greater shear deformation is necessary in the intermediate rubber layers 8 towards the outside, so with this specification it is possible to prevent an excessive load being produced in some of the intermediate rubber layers 8 when inflating the body portion 2.

Also, in the uninflated neutral state, the external diameter of the body portion 2 is, for example, 3 m to 5 m. With the external diameter in this range handling when the fender is not in use such as during storage or transport, and the like, is comparatively easy.

What is claimed is:

1. A pneumatic fender comprising mirror sections at the two ends of a cylindrical body portion, a plurality of reinforcing layers is laminated between an inner layer rubber and an outer layer rubber, the reinforcing layers are cord layers formed by arranging a plurality of cords in parallel, and the cords of reinforcing layers that are laminated adjacent to each other intersect with a predetermined cord angle with respect to the body axial direction, wherein an intermediate rubber layer is interposed between the reinforcing layers, and in an uninflated neutral state the thickness of the intermediate rubber layer is set to 1 mm to 5 mm, and the cord angle is set to 15° to 45°.

2. The pneumatic fender according to claim 1, wherein the 100% modulus of the rubber of the intermediate rubber layer is 0.5 MPa to 5.0 MPa.

3. The pneumatic fender according to claim 2, wherein the thickness of the intermediate rubber layer in the uninflated neutral state increases toward the outer circumferential side.

4. The pneumatic fender according to claim 2, wherein the external diameter of the body portion in the uninflated neutral state is 3 m to 5 m.

5. The pneumatic fender according to claim 1, wherein the thickness of the intermediate rubber layer in the uninflated neutral state increases toward the outer circumferential side.

6. The pneumatic fender according to claim 5, wherein the external diameter of the body portion in the uninflated neutral state is 3 m to 5 m.

7. The pneumatic fender according to claim 1, wherein the external diameter of the body portion in the uninflated neutral state is 3 m to 5 m.

8. The pneumatic fender according to claim 1, wherein the intermediate layer comprises a plurality of intermediate layers interposed between the reinforcing layers.

9. The pneumatic fender according to claim 1, wherein the intermediate layer comprises a plurality of intermediate layers, each of the plurality of intermediate layers being interposed between a plurality of adjacent reinforcing layers.

* * * * *